United States Patent
Patil et al.

(10) Patent No.: US 10,409,775 B2
(45) Date of Patent: Sep. 10, 2019

(54) RENAMING A DIRECTORY THAT RESIDES ON A LAYERED VOLUME

(71) Applicant: Wyse Technology L.L.C., Santa Clara, CA (US)

(72) Inventors: Rushikesh Patil, Sunnyvale, CA (US); Puneet Kaushik, Fremont, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 382 days.

(21) Appl. No.: 15/142,041

(22) Filed: Apr. 29, 2016

(65) Prior Publication Data

US 2017/0315999 A1 Nov. 2, 2017

(51) Int. Cl.
 *G06F 16/16* (2019.01)
(52) U.S. Cl.
 CPC .................. *G06F 16/164* (2019.01)
(58) Field of Classification Search
 CPC .................................................. G06F 16/164
 See application file for complete search history.

(56) References Cited

U.S. PATENT DOCUMENTS

| 2003/0233489 | A1* | 12/2003 | Blaser | G06F 8/61 719/328 |
| 2012/0254861 | A1* | 10/2012 | Down, Jr. | G06F 8/63 718/1 |
| 2013/0339299 | A1* | 12/2013 | Muller | G06F 11/1464 707/640 |

* cited by examiner

*Primary Examiner* — Van H Oberly
(74) *Attorney, Agent, or Firm* — Kirton McConkie; Brian Tucker

(57) ABSTRACT

A directory that resides on a layered volume can be renamed. A hooking module can be employed to intercept rename requests. The hooking module can query a layering file system filter driver to determine the volume of the source and target of the rename request. If the source and target are on different volumes, thereby indicating that the source is a directory of a layered volume, the hooking module can append a signature to the target which identifies the actual volume of the source. The modified rename request can then be passed to the operating system which will perform its normal operations including verifying that the source and target are on the same volume. During this verification, the layering file system filter driver can detect the appended signature in the target and can inform the operating system that the target is on the volume identified in the signature.

20 Claims, 9 Drawing Sheets

RENAMING A DIRECTORY THAT RESIDES ON A LAYERED VOLUME

CROSS-REFERENCE TO RELATED APPLICATIONS

N/A

BACKGROUND

The present invention is generally directed to allowing a directory to be renamed when the directory resides on a layered volume. A layering system is a tool that enables an operating system, user applications, and user data to be layered on the user's computing device. When using a layering system, layered applications and data are executed natively on the user's computing device without the use of a virtual machine or other sandboxed execution environment. This native execution will therefore cause the layered applications to appear, both to the user and to other applications, as if they were being executed in a "normal" manner. This is in contrast to many types of virtualization techniques such as terminal services and application virtualization where it is typically clear that the applications are executed in a separate environment.

U.S. patent application Ser. Nos. 14/719,248 and 14/719,256 are both directed to a layering system and provide a background for the present invention. The content of these applications is therefore incorporated by reference. It is noted that both of these applications are commonly owned and would not constitute prior art to the present invention. Therefore, this background should not be construed as admitting prior art, but should be construed as describing various features on which the present invention is based and that may even form part of the present invention.

As is described in the '248 and '256 applications, a layer is a collection of data or resources which enables the collection to be isolated or set apart from the data or resources in another layer. To summarize this layering, FIG. 1 provides simplified examples of a user data layer 101 and an application layer 102. It is noted that a layer containing an operating system may also exist. Each layer can be stored in a manner that allows the layer to be separately mounted for access. For example, each layer may comprise a separate partition of a disk (including of a virtual disk), a folder, a network share, etc. The ability to separately mount a layer allows the layering system to selectively provide access to particular layers. It will be assumed that the layering system determines that user data layer 101 and application layer 102 should be mounted in response to the user logging in to a computing device on which the layering system executes or which the layering system otherwise controls.

As shown in FIG. 1 and for simplicity, application layer 102 includes a single application, WINWORD.EXE, which is the executable for Microsoft Word. Word also requires a number of registry settings to execute properly, and therefore, application layer 102 also includes such registry settings. It is noted that these registry settings, which would normally be stored within the registry of the operating system, could be stored within application layer 102 in a registry hive. Of course, a typical installation of Word would require a number of other files and/or settings which are not depicted. Application layer 102 also includes layer metadata which describes the content of application layer 102 (e.g., which describes that the layer includes WINWORD.EXE and whatever structure is used to store the Word registry settings). This layer metadata is critical because it allows the layering system to quickly determine what exists on the layer.

User data layer 101 is structured in a similar way. However, as a user data layer, it stores the user's files which in this case constitute two Word documents: Report.docx and Summary.docx. As with application layer 102, user data layer 101 may also store a number of other files including configuration files that may be particular to this user (e.g., a template file for Word). User data layer 101 also includes layer metadata which defines the content of the layer. Again, this layer metadata is critical because it allows the layering system to quickly determine what exists on the layer.

As mentioned above, a layer can be a separately mountable portion of a storage device (whether physical or virtual) such as a partition, folder, network share, etc. Accordingly, when the user logs on to a computing device, the layering system can mount layers 101 and 102 so that the user will have access to MS Word and his documents which are included in these layers. However, if a different user were to log in to the same computing device, the layering system could instead mount an application layer and user data layer pertaining to the different user so that the different user can only access the applications and user data defined in those layers.

The process by which the user accesses the data and resources included on each layer is provided in the '248 and '256 applications and will not be described in detail in this specification. By way of an overview, the layering system includes a file system filter driver and a registry filter driver which can function to intercept and redirect file system and registry operations as appropriate. In particular, these filters can be registered with the OS so that they will receive all file system and registry operations respectively. If a file system or registry operation pertains to content of a layer rather than to content of the file system or registry directly provided by the OS, the filters can redirect the operation to the corresponding layer. The '248 and '256 applications provide a number of examples of this type of redirection.

The result of this redirection is that, from the user perspective, the files of the layers do not appear to be stored in a different manner than any other file would typically be stored by the OS. For example, if the user data layer 101 were assigned a volume of E: the layering system could cause the files to appear as if they were stored in the typical C: volume. In other words, the fact that multiple volumes may be loaded is abstracted (and even hidden) from the user perspective. It is again reiterated that the use of layer metadata to define what is stored on each layer allows this process to be carried out efficiently as is described in the '248 and '256 applications.

FIGS. 2A and 2B each illustrate an example of how the layering system can function. Each of these examples involve the layering file system filter driver (or LFFD) 201 and its role in determining whether to redirect a file open request. It is noted that a similar process would be carried out by the layering registry filter driver (or LRFD) if the operation pertained to the registry.

As shown in FIGS. 2A and 2B, it will be assumed that the operating system provides a file system 200 for handling I/O to the various mounted partitions. It will also be assumed that the operating system has mounted a C: volume and that the layering system has mounted an E: volume that corresponds to user data layer 101. In the following description, the E: volume and user data layer 101 (or simply layer) will be used interchangeably. Because of the layering system, even though the E: volume is a separate volume from the C:

volume, the contents of the E: volume will appear as if they were stored on the C: volume. In other words, the layering system can make it appear as if a single volume were mounted.

Accordingly, if the user selects to open the Report.docx file that is stored on the E: volume, a file open request 210 of C:\Docs\Report.docx may be generated. As is described in the '248 and '256 applications, LFFD 201 is registered as a filter driver for file system 200 and therefore will receive the opportunity to evaluate file open request 210. LFFD 201 can evaluate the target of file open request 210 against the layer metadata of the E: volume (and possibly against layer metadata of any other mounted layer) to determine if the request pertains to the layer. In this case, it will be assumed that the layer metadata indicates that the E: volume includes the path \Docs and that the Report.docx file is stored in the path. As a result, LFFD 201 can modify file open request 210 to create modified file open request 210a of E:\Docs\Report.docx. Modified file open request 210a is then passed to file system 200 which will open Report.docx from the appropriate location on the E: volume. LFFD 201 can perform this type of rerouting for any I/O that pertains to content stored on the E: volume. The determination of whether I/O pertains to content on a particular layer is based on the layer metadata for that particular layer.

FIG. 2B illustrates the case where LFFD 201 determines that a file open request 220 does not pertain to a layer (or at least does not pertain to a layer separate from the layer that includes the operating system). In this example, file open request 220 is directed to File.txt which is stored in a Downloads folder that is assumed to exist on the C: volume. Upon receiving file open request 220, LFFD 201 will evaluate the request against the layer metadata for the E: volume and determine that the E: volume does not include a path of \Downloads. Accordingly, LFFD 201 can allow file open request 220 to pass to file system 200 without modification since the request already includes the correct path to File.txt.

To summarize, LFFD 201 selectively modifies I/O requests so that they are directed to the appropriate layer. In the case of registry access, the LRFD would perform similar functionality to ensure that the registry access is directed to the appropriate layer. It is again reiterated that this rerouting is necessary because the layering system causes the layers to be hidden from the user's perspective while still being visible to the underlying file system.

Although a layering system allows layers to be employed in a substantially transparent manner from the user perspective, some problems exists. For example, due to the way in which the Windows operating system functions, a directory that resides on a layered volume that is different than the operating system volume cannot be renamed in a conventional manner FIG. 3 illustrates why this is so.

In FIG. 3, it is assumed that the computing system includes an OS layer as the C: volume and an application layer as the E: volume, and that, for the reasons indicated above, the contents of each layer is merged to appear as if it is all stored on the C: volume. It is also assumed that the E: volume includes a directory named Dir1 at the path E:\Dir1. However, due to LFFD 201, the user will see this directory as C:\Dir1.

Operating system (OS) 301 is shown as receiving a request to rename C:\Dir1 to C:\Dir2. For example, the user could right click on the Dir1 folder in Windows explorer, select "rename" from the drop-down menu, and then type Dir2. In response to this user input, OS 301 would commence a series of steps to complete the rename process. In step 1, OS 301 will send a request to file system 200 querying the location of the source directory which in this case is C:\Dir1. LFFD 201 will intercept this request and employ the metadata of the layers to determine that the directory Dir1 is actually stored on the E: volume. Therefore, in response to this query, LFFD 201 will respond with E:\Dir1.

Then, in step 2, OS 301 will send a second request to file system 200 querying the location of the target directory which in this case is C:\Dir2. LFFD 201 will determine that no directory Dir2 exists on any of the layers and will respond accordingly. As a result, in step 3, OS 301 will send a third request to file system 200 querying the location of the target directory's parent directory. In response to this third request, LFFD 201 can respond with C:\ (or could allow the request to pass through to file system 200 which would generate the same response). OS 301 can then generate the target of the rename operation by combining the parent directory (C:\) with the name of the new directory (Dir2) yielding C:\Dir2.

Once OS 301 has identified the source and target of the rename operation, it can then determine whether the source and target have the same volumes. In this case, the source is E:\Dir1 and the target is C:\Dir2. In cases where OS 301 will not allow a rename to occur across volumes (which is the case in Windows), the rename operation will fail since the source volume is E: while the target volume is C:. Due to the fact that OS 301 issues the requests in steps 2 and 3 independently of the request in step 1, LFFD 201 has no way of knowing that these queries for the location of the target pertains to an attempt to rename a directory on the E:\ volume. In other words, OS 301 does not provide any indication that the requests of steps 1-3 are related. LFFD 201 therefore has no way of knowing that it should specify the E: volume in its responses to the requests in either steps 2 or 3. For these reasons, the presence of LFFD 201 can prevent a directory on a layered volume from being renamed.

BRIEF SUMMARY

The present invention extends to methods, systems, and computer program products for renaming a directory that resides on a layered volume. A hooking module can be employed to intercept rename requests. The hooking module can query a layering file system filter driver to determine the volume of the source and target of the rename request. If the source and target are on different volumes, thereby indicating that the source is a directory of a layered volume, the hooking module can append a signature to the target which identifies the actual volume of the source. The modified rename request can then be passed to the operating system which will perform its normal operations including verifying that the source and target are on the same volume. During this verification, the layering file system filter driver can detect the appended signature in the target and can inform the operating system that the target is on the volume identified in the signature. This will cause the operating system to determine that the source and target are on the same volume, and, as a result, the operating system will allow the rename operation to be completed.

In some embodiments, the present invention is implemented as a method for enabling a directory on a layered volume to be renamed. A hooking module can intercept a rename request that is directed to an operating system. The rename request identifies a source and a target. The source comprises a directory and the target comprises a new name for the directory. The hooking module can then communicate with a layering file system filter driver to determine a volume of the source and a volume of the target. Upon determining that the volume of the source is not the same as the volume of the target, the hooking module can append a signature to the target. The signature identifies the volume of the source. The hooking module can then route the rename request to the operating system.

In another embodiment, the present invention is implemented as computer storage media storing computer-executable instructions which when executed by one or more processors implement a method for enabling a directory on a layered volume to be renamed. A hooking module can intercept a rename request that is directed to an operating system. The rename request identifies a source and a target. The hooking module can determine that the source is a directory. In response to determining that the source is a directory, the hooking module can communicate with a layering file system filter driver to determine a volume of the source and a volume of the target. Upon determining that the volume of the source is not the same as the volume of the target, the hooking module can append a signature to the target. The signature identifies the volume of the source. Then, the hooking module can route the rename request to the operating system.

In another embodiment, the present invention can be implemented as a system comprising one or more processors and memory storing computer-executable instructions which when executed by the one or more processors implement a method for enabling a directory on a layered volume to be renamed. This method can include: intercepting, at a hooking module, a rename request that is directed to an operating system, the rename request identifying a source and a target; determining that the source is a directory; in response to determining that the source is a directory, communicating with a layering file system filter driver to determine a volume of the source and a volume of the target; upon determining that the volume of the source is not the same as the volume of the target, appending a signature to the target, the signature identifying the volume of the source; routing the rename request to the operating system; receiving, by the layering file system filter driver, the rename request from the operating system, the rename request including the target with the appended signature; and modifying the rename request to remove the appended signature from the target and to update the source and target to identify a volume of a layer on which the directory is stored.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "volume" will be used in accordance with its general meaning in a Windows operating system. However, due to the ambiguity that is sometimes associated with this term, it is noted that, for purposes of this description, a volume can generally be viewed as something to which a drive letter (e.g., C:, D:, E:, etc.) is assigned. For example, in a layering system, each layer that is mounted will be assigned a unique drive letter and can therefore be considered a volume.

The term "layered volume" will be used to refer to volumes whose contents are caused to appear as if they were stored in another volume. In most scenarios, a layered volume will constitute a volume other than the volume on which the operating system is stored. For example, the operating system may typically reside on the C: volume. Then, if an application layer is mounted as the E: volume, it would be considered a layered volume since the layering file system filter driver would cause the contents of the E: volume to appear to the user as if they were stored in the C: volume. However, it is also possible to cause an operating system layer to be a layered volume (e.g., when the operating system layer is mounted as the D: volume but its contents are caused to appear as if they were stored on the C: volume). In short, a layered volume is a volume that receives I/O requests that were originally directed to a different volume but that were modified by the layering filter driver to redirect them to that volume.

The present invention can enable a directory on a layered volume to be renamed while still employing the operating system's standard renaming process. In other words, the present invention can operate in conjunction with the steps depicted in FIG. 3, but can employ techniques to inform LFFD 201 when a directory on a layered volume is being renamed LFFD 201 can therefore respond to OS 301's request in an appropriate manner to prevent the rename request from failing.

Figure 1:
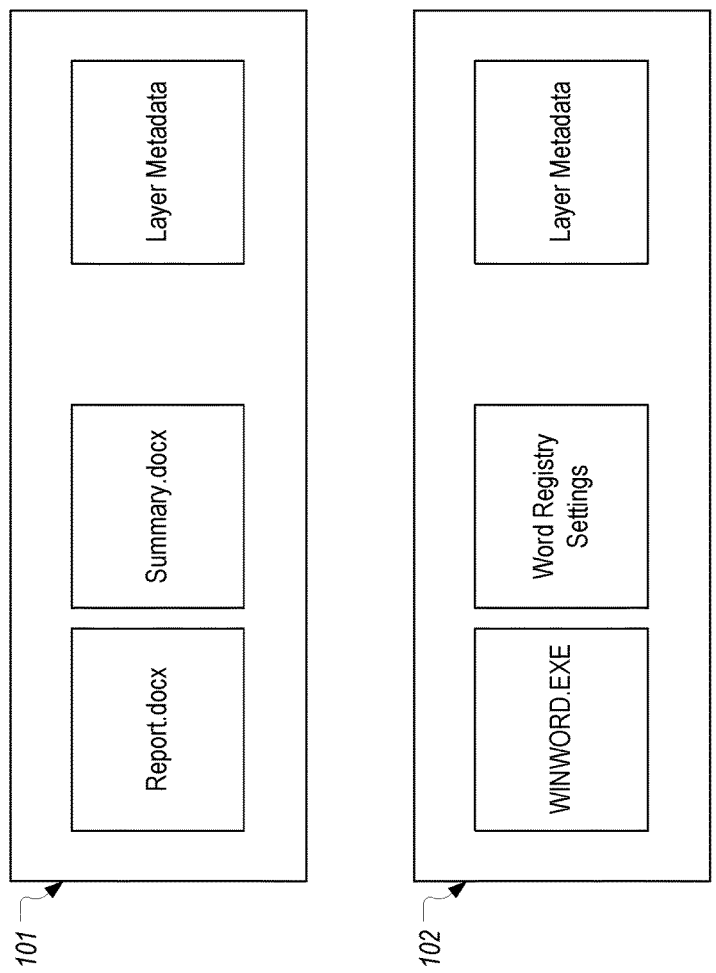
FIG. 1 illustrates simplified examples of layers of a layering system.
Figure 2A:
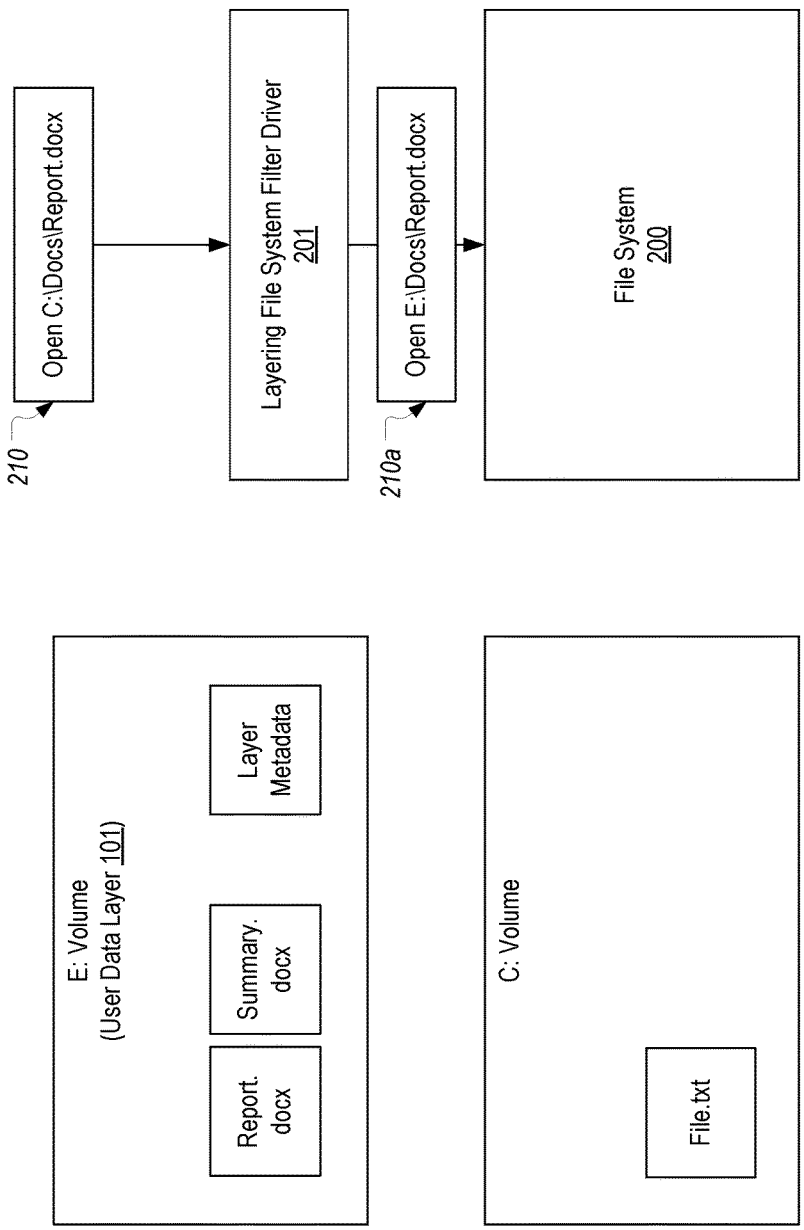
FIGS. 2A and 2B generally illustrate how a layering system can reroute file system or registry operations based on layer metadata of a mounted layer.
Figure 2B:
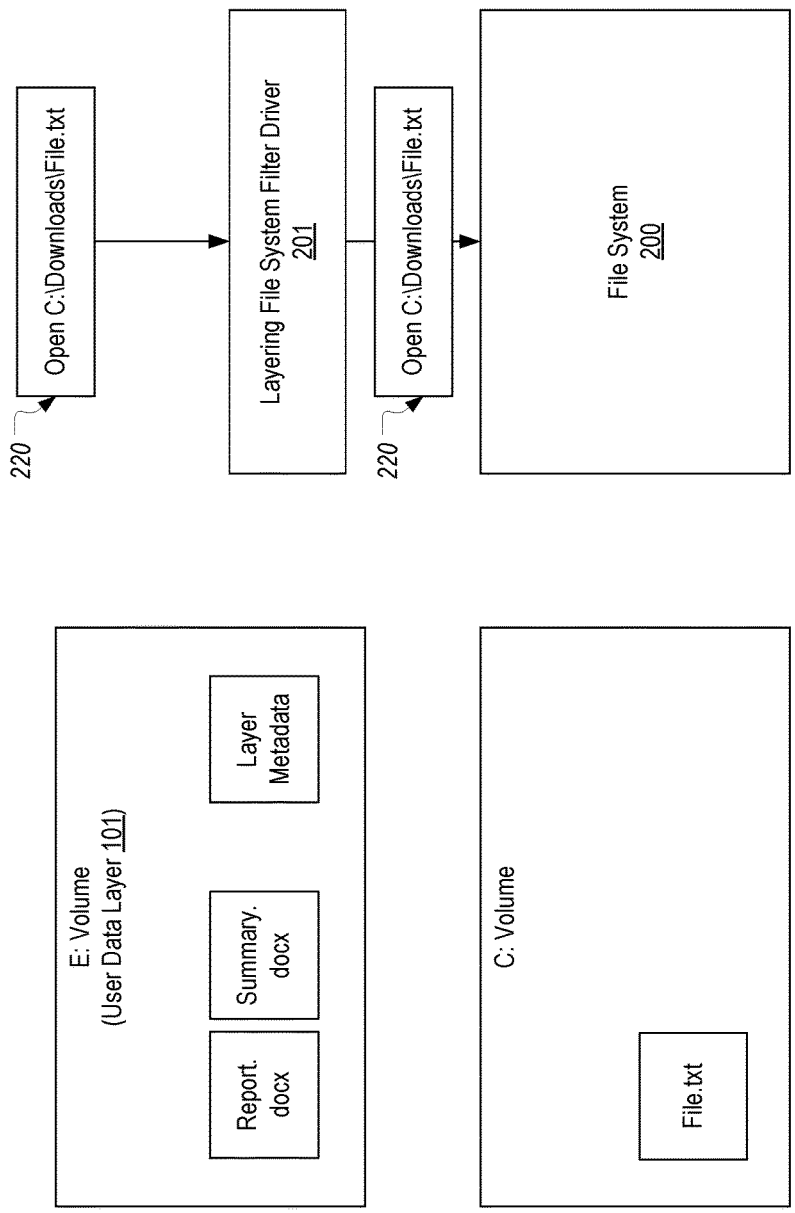
Figure 3:
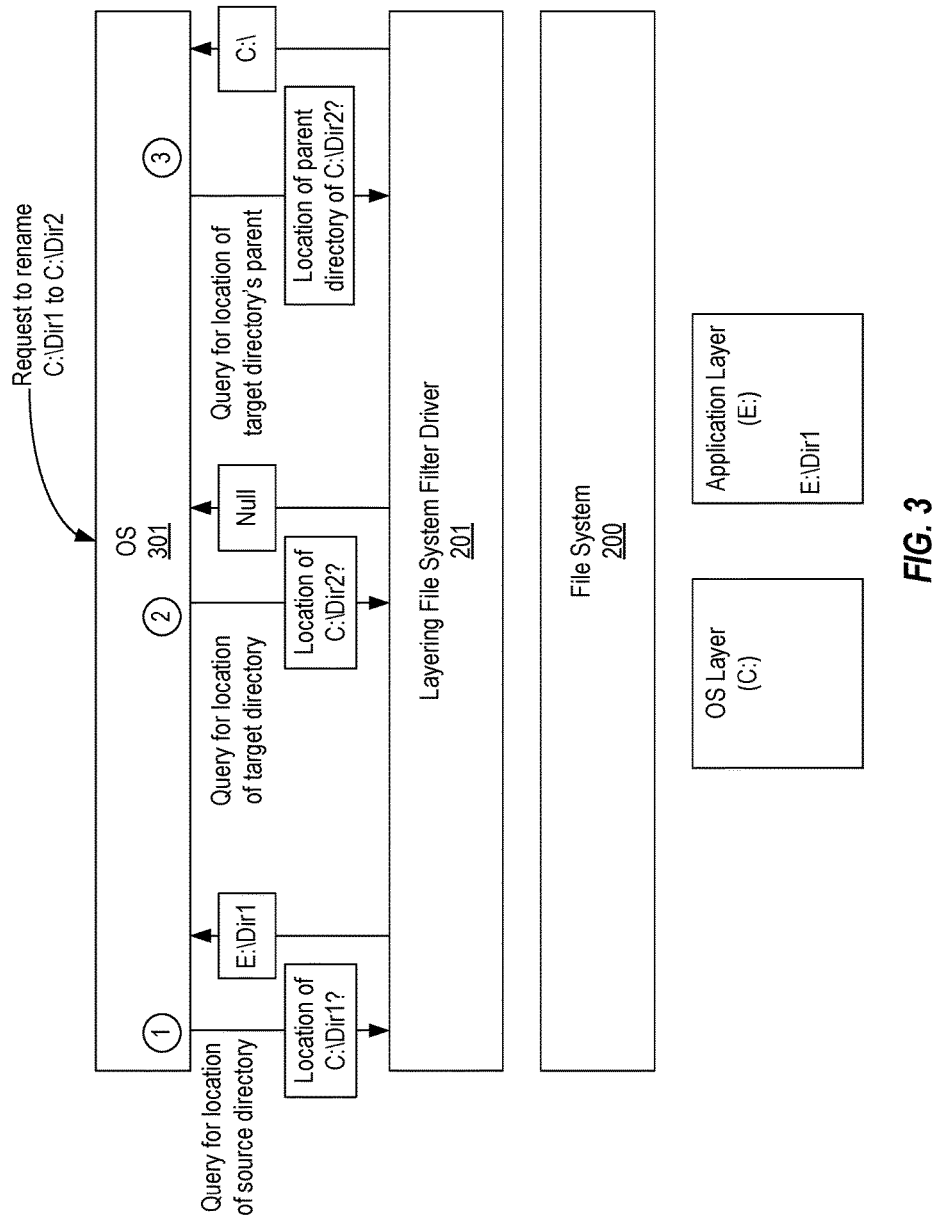
FIG. 3 illustrates how a layering file system filter driver can cause a rename operation of a directory on a layered volume to fail.
Figure 4:
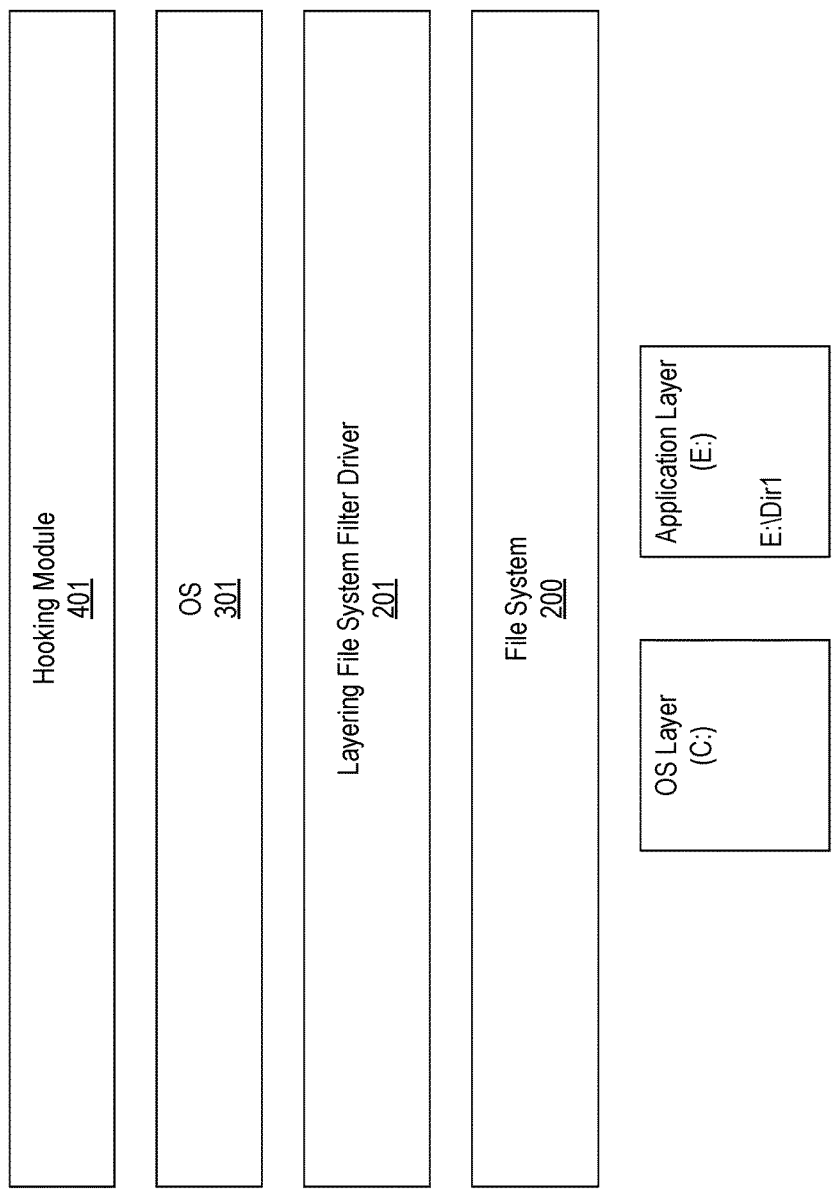
FIG. 4 illustrates an architecture that can be employed to enable a directory on a layered volume to be renamed.

FIG. 4 illustrates an example architecture that can be employed to implement the present invention. The architecture depicted in FIG. 4 is the same as that of FIG. 3 with the addition of a hooking module 401. Hooking module 401 is positioned above OS 301 to indicate that it intercepts rename operations before they reach the rename components of the operating system. Any known API hooking technique can be employed to accomplish this interception of the rename operations. Therefore, hooking module 401 can represent any component that can be configured to intercept rename requests. As an overview, hooking module 401 can be configured to identify whether a rename operation pertains to a directory on a layered volume, and if so, can append a signature to the target of the rename operation which identifies the actual volume of the source.

Figure 5:
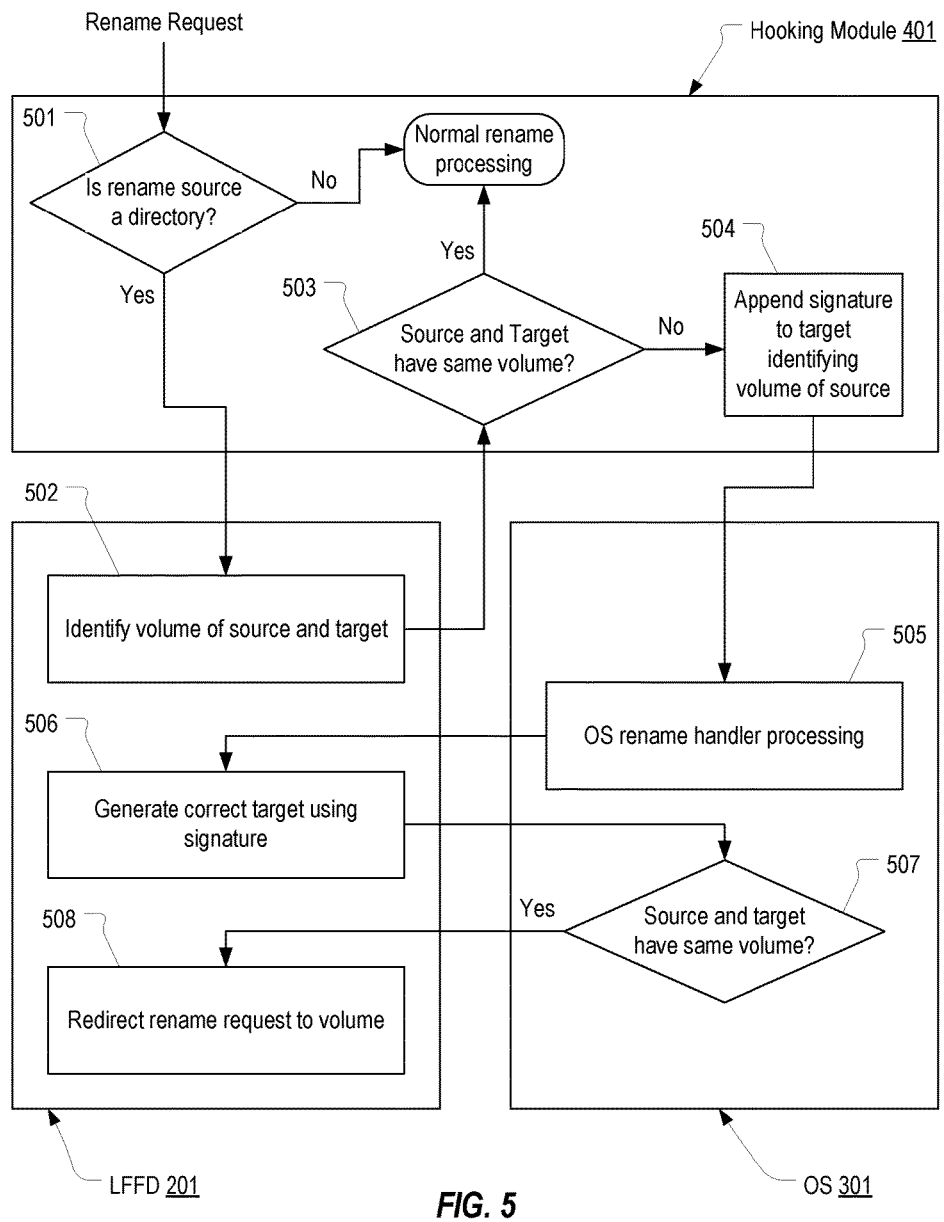
FIG. 5 illustrates a flowchart of a process by which a directory on a layered volume can be renamed.

FIG. 5 provides a flowchart illustrating how the rename process can be handled in accordance with embodiments of the present invention. When a rename request is generated, hooking module 401 can intercept the rename request rather than allowing it to proceed directly to OS 301. Hooking module 401 could be configured to intercept rename requests in any suitable manner including by using API hooking techniques such as registry-based DLL injection, system wide windows hooking (e.g., using the SetWindowsHookEx( ) API), MS detour, etc. As an example, registry-based DLL injection could be performed by adding the name of the hooking DLL (e.g., hooking module 401) to the HKEY_LOCAL_MACHINE \Software\Microsoft\ Windows NT\CurrentVersion\Windows Ap pInit_DLLs registry value. All DLLs specified in this registry value are loaded by every Windows application running within the current session. Actual loading of the DLLs occurs while initializing USER32.dll which reads the registry value and calls LoadLibrary( ) for each listed DLL.

Once the hooking DLL is loaded, it can load the import address table (IAT) which contains the name of APIs and their addresses. The hooking DLL can modify the IAT to change the address of MoveFileEx (which is an API involved in rename operations) to point to the hooking DLL and can store the original address of MoveFileEx. By doing this, all MoveFileEx calls will get redirected to the hooking DLL which can then perform the necessary processing and then complete the call using the original address. It is again reiterated that this is only one example of how rename operations can be intercepted and any other hooking technique could equally be employed.

Accordingly, FIG. 5 depicts that the rename request is initially handled by hooking module 401 rather than by OS 301. After intercepting a rename request, hooking module 401 can determine whether the rename request pertains to a directory in step 501. This determination can be made by evaluating the contents of the rename request (e.g., to determine whether it pertains to a file or a directory). If the rename request is not directed to a directory, the rename request can simply be passed on to OS 301 for normal processing. However, if the rename request pertains to a directory, hooking module 401 can query LFFD 201 to identify the volume of the source and target of the rename request. Hooking module 401 can query LFFD 201 for this information in substantially the same manner as described in FIG. 3. In response, in step 502, LFFD 201 will respond with the source and target in a similar manner as depicted in FIG. 3. For example, if the rename request identifies the source as C:\Dir1 and the target as C:\Dir2, LFFD 201 would inform hooking module 401 that the source is EADir1 and the target is C:\Dir2.

Once hooking module 401 has determined the source and target of the rename request, it can then determine whether the source and target are the same volume in step 503. If so, the rename request can simply be passed on to OS 301 for normal processing since the OS will allow directory renames on the same volume to proceed. However, if the source and target are not the same volume, hooking module 401 can take action to prevent the rename request from failing. Specifically, in step 504, hooking module 401 can append a signature to the target which identifies the volume of the source. Using the same example as above, hooking module 401 could modify the target C:\Dir2 to be C:\Dir2_$ign_Vol_E. The "$ign" portion of the appended signature can identify that the following characters are part of an appended signature rather than the new name of the directory, while the "Vol_E" portion of the appended signature can identify the volume of the source.

After the target is updated to include the signature, the rename request can be passed on to OS 301 for normal processing. Therefore, in step 505, OS 301 performs the steps shown in FIG. 3 to identify the volume of the source and target. For example, OS 301 can send a request to file system 200 (which would be intercepted by LFFD 201) for the volume of the source specified in the rename request (e.g., C:\Dir1). In response, and in the same manner as shown in FIG. 3, LFFD 201 can respond with E:\Dir1. Similarly, OS 301 can send a request for the volume of the target (or more specifically, the volume of the parent directory) specified in the rename request which would now be C:\Dir2_Sign_Vol_E due to hooking module 401's preprocessing.

Upon receiving this request, LFFD 201 can detect the presence of an appended signature in the target (e.g., by detecting "$ign" in the directory name of the target). By detecting the signature, LFFD 201 can know that the query pertains to a request to rename a directory. Accordingly, LFFD 201 can know that it should generate a response that identifies the volume of the source as identified in the appended signature. For example, LFFD 201 can identify "Vol_E" in the target and determine that it should respond by identifying volume E: as the target. Therefore, in step 506 LFFD 201 generates and returns a correct target based on the signature.

As a result of this processing, in step 507, OS 301 will determine that the source and the target are the same and will therefore allow the rename request to be completed. OS 301 then sends the rename request towards file system 200. In step 508, LFFD 201 will receive the rename request, remove the appended signature from the target, and route the request to the appropriate volume (e.g., by changing C: to E: in the source and target). In short, the appended signature can be employed to prevent OS 301 from failing the rename request at step 507.

Figure 6A:
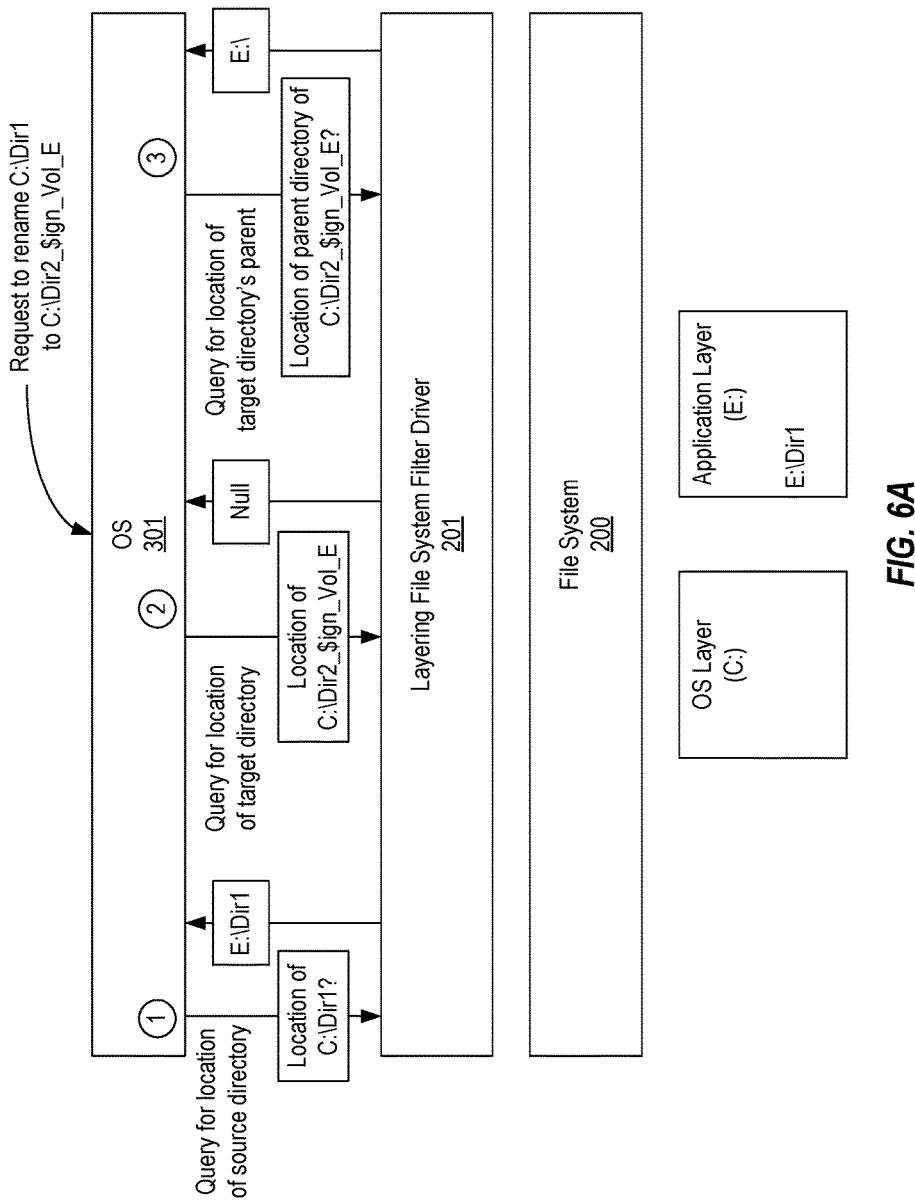
FIGS. 6A and 6B illustrate how information provided by a hooking module can enable a layered file system filter driver to cause a rename operation of a directory on a layered volume to succeed.

FIG. 6A represents the communications between OS 301 and LFFD 201 when a signature has been added to the target. As shown, because of hooking module 401, the rename request that is received by OS 301 will include a target containing an appended signature (e.g., C:\Dir2_$ign_Vol_E). OS 301 can then perform a similar process as described in FIG. 3 to determine whether the source and target are on the same volume. Steps 1 and 2 of this process will be substantially the same as in FIG. 3. In particular, in step 2, OS 301 will request the location of a directory named Dir2_$ign_Vol_E. Because no such directory will exist, LFFD 201 can respond in a similar manner as in FIG. 3.

In contrast, in step 3, when OS 301 requests the location of the parent directory of C:\Dir2_$ign_Vol_E, LFFD 201 can detect the presence of the signature and use it to respond with the volume of the source (e.g., E:\). OS 301 will therefore determine that the source and target are on the same volume (e.g., that they are both on the E: volume) and can therefore allow the rename operation to proceed.

Figure 6B:
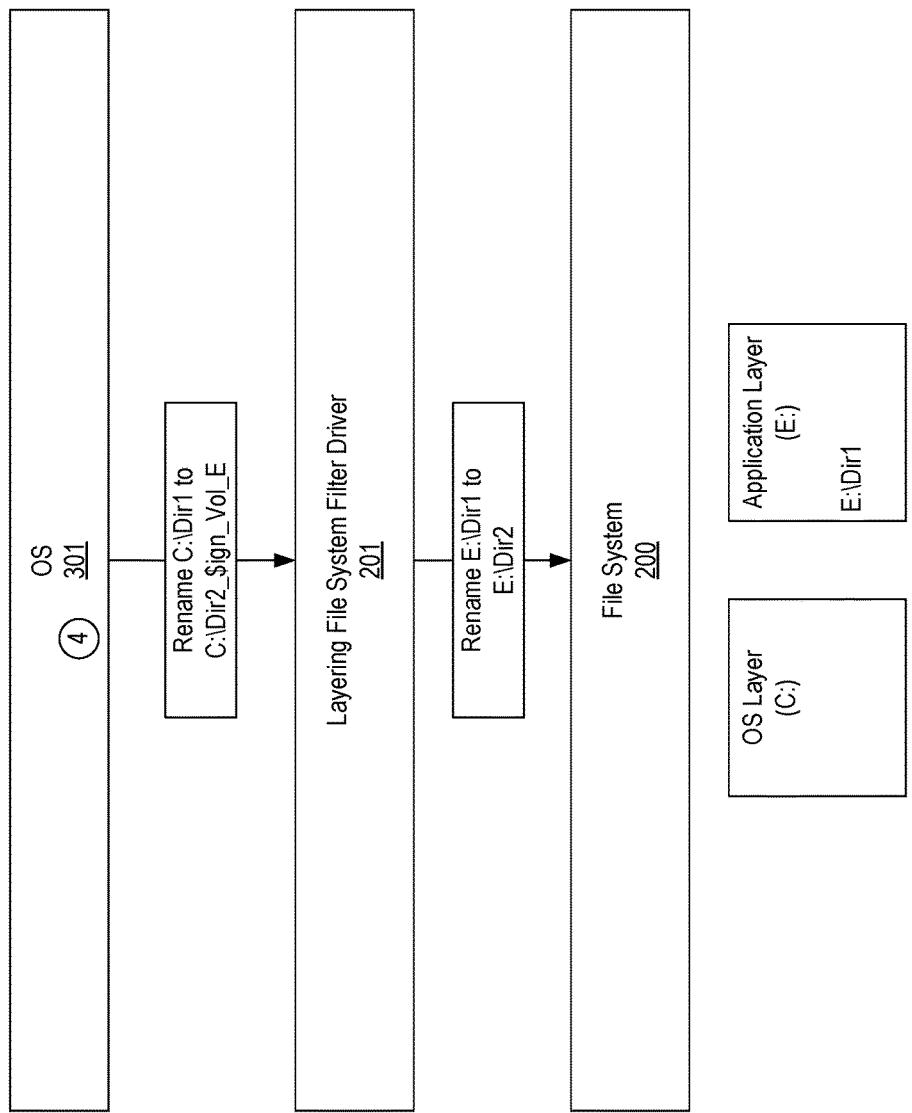

Accordingly, FIG. 6B represents that, in step 4, OS 301 sends the rename request identifying C:\Dir1 as the source and C:\Dir2_$ign_Vol_E as the target. LFFD 201 can process this rename request to remove the appended signature from the target, change the volume to E: in the source and target, and then route the request to file system 200 so that the directory Dir1 on the E: volume will be renamed to Dir2.

Figure 7:
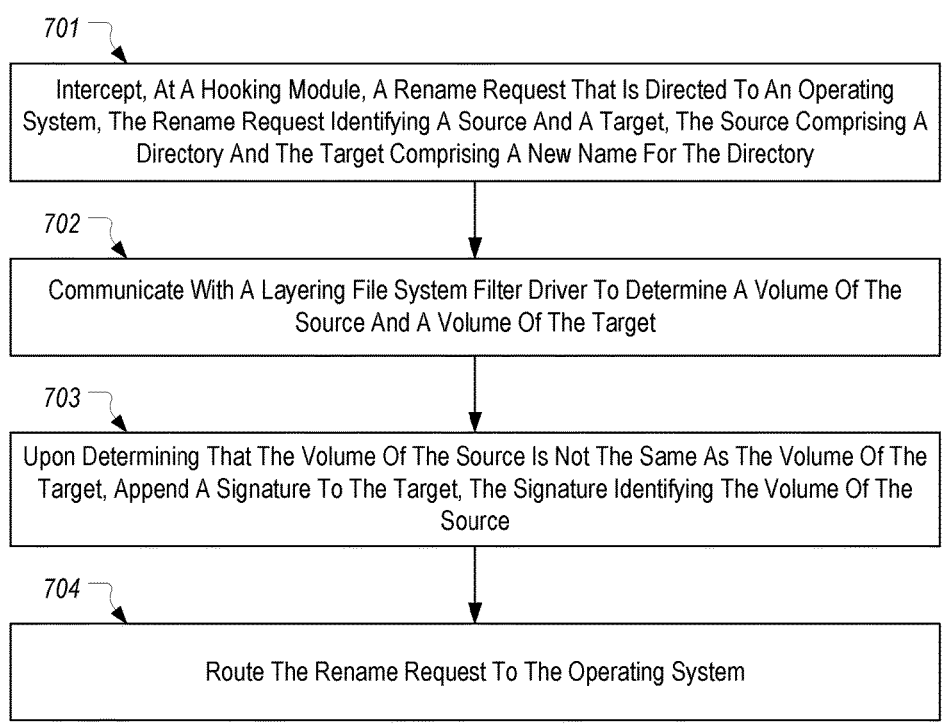
FIG. 7 illustrates a flowchart of an example method for enabling a directory on a layered volume to be renamed.

FIG. 7 illustrates a flowchart of an example method 700 for enabling a directory on a layered volume to be renamed Method 700 can be performed by hooking module 401.

Method 700 includes an act 701 of intercepting, at a hooking module, a rename request that is directed to an operating system, the rename request identifying a source and a target, the source comprising a directory and the target comprising a new name for the directory. For example, hooking module 401 could intercept a request to rename Dir1, which is stored on a layer that is assigned the E: volume, to Dir2.

Method 700 includes an act 702 of communicating with a layering file system filter driver to determine a volume of the source and a volume of the target. For example, hooking module 401 can communicate with LFFD 201 to determine the volume of C:\Dir1 and the volume of C:\Dir2.

Method 700 includes an act 703 of, upon determining that the volume of the source is not the same as the volume of the target, appending a signature to the target, the signature identifying the volume of the source. For example, hooking module 401 can append_$ign_Vol_E to C:\Dir2.

Method 700 includes an act 704 of routing the rename request to the operating system. For example, hooking module 401 can route the rename request with the modified target to OS 301 which will then commence processing the rename request in a typical manner.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for enabling a directory on a layered volume to be renamed, the method comprising:
    intercepting, at a hooking module, a rename request that is directed to an operating system, the rename request identifying a source and a target;
    determining that the source identified in the rename request is a current name for a directory and that the target identified in the rename request is a new name for the directory;
    communicating with a layering file system filter driver to determine a volume of the source and a volume of the target;
    upon determining that the volume of the source is not the same as the volume of the target, modifying the rename request to append a signature to the target, the signature identifying the volume of the source, such that the target identified in the modified rename request includes the new name for the directory and the signature that identifies the volume of the source; and
    routing the modified rename request to the operating system.

2. The method of claim 1, further comprising:
    receiving, by the layering file system filter driver, a request from the operating system to identify a volume of the target; and
    responding to the request by specifying the volume of the source as identified in the signature.

3. The method of claim 2, wherein the request from the operating system comprises a request to identify a volume of a parent directory of the target.

4. The method of claim 1, further comprising:
    intercepting, at the hooking module, a second rename request that is directed to the operating system, the second rename request identifying a second source and a second target;
    determining that the second source identified in the second rename request is not a directory; and
    routing the second rename request to the operating system without modifying the second source or the second target.

5. The method of claim 1, wherein the directory is stored on a layered volume.

6. The method of claim 1, further comprising:
    receiving, by the layering file system filter driver and from the operating system, the modified rename request; and
    updating the modified rename request to remove the appended signature from the target.

7. The method of claim 6, wherein updating the modified rename request includes changing a volume specified in the source and the target.

8. The method of claim 7, wherein changing the volume specified in the source and the target comprises changing the volume to a volume assigned to a layer on which the directory is stored.

9. The method of claim 7, wherein changing the volume specified in the source and the target comprises changing the volume from an operating system volume to a volume on which the directory stored.

10. One or more computer storage media storing computer-executable instructions which when executed by one or more processors implement a method for enabling a directory on a layered volume to be renamed, the method comprising:
- intercepting, at a hooking module, a rename request that is directed to an operating system, the rename request identifying a source and a target;
- determining that the source identified in the rename request is a directory;
- in response to determining that the source identified in the rename request is a directory, communicating with a layering file system filter driver to determine a volume of the source and a volume of the target;
- upon determining that the volume of the source is not the same as the volume of the target, modifying the rename request to append a signature to the target, the signature identifying the volume of the source, such that the target identified in the modified rename request includes the signature that identifies the volume of the source; and
- routing the modified rename request to the operating system.

11. The computer storage media of claim 10, wherein communicating with a layering file system filter driver to determine a volume of the target comprises receiving a response from the layering file system filter driver that identifies a volume of a parent directory of the target.

12. The computer storage media of claim 10, wherein the signature includes a portion that identifies that a signature is appended to the target and a portion that identifies the volume of the source.

13. The computer storage media of claim 12, wherein the portion that identifies that a signature is appended comprises a predetermined sequence of characters.

14. The computer storage media of claim 10, further comprising:
- receiving, by the layering file system filter driver, a request from the operating system to identify a volume of the target; and
- responding to the request by specifying the volume of the source as identified in the signature.

15. The computer storage media of claim 14, wherein the request from the operating system comprises a request to identify a volume of a parent directory of the target.

16. The computer storage media of claim 10, wherein the directory is stored on a layered volume.

17. The computer storage media of claim 10, further comprising:
- receiving, by the layering file system filter driver and from the operating system, the modified rename request; and
- updating the modified rename request to remove the appended signature from the target.

18. The computer storage media of claim 17, wherein updating the modified rename request includes changing a volume of the source and target to a volume on which the directory is stored.

19. A system comprising:
- one or more processors; and
- memory storing computer-executable instructions which when executed by the one or more processors implement a method for enabling a directory on a layered volume to be renamed, the method comprising:
  - intercepting, at a hooking module, a rename request that is directed to an operating system, the rename request identifying a source and a target;
  - determining that the source identified in the rename request is a directory;
  - in response to determining that the source identified in the rename request is a directory, communicating with a layering file system filter driver to determine a volume of the source and a volume of the target;
  - upon determining that the volume of the source is not the same as the volume of the target, modifying the rename request to append a signature to the target, the signature identifying the volume of the source, such that the target identified in the modified rename request includes the signature that identifies the volume of the source;
  - routing the modified rename request to the operating system;
  - receiving, by the layering file system filter driver, the modified rename request from the operating system, the modified rename request; and
  - updating the modified rename request to remove the appended signature from the target and to update the source and target to identify a volume of a layer on which the directory is stored.

20. The system of claim 19, wherein the method further comprises:
- prior to receiving the modified rename request from the operating system, receiving, by the layering file system filter driver and from the operating system, a request to identify a volume of the target;
- detecting the signature appended to the target; and
- responding to the request by identifying the volume of the source that is specified in the signature.

* * * * *